(12) United States Patent
Cusson et al.

(10) Patent No.: US 8,839,573 B2
(45) Date of Patent: Sep. 23, 2014

(54) SPRING CLIP

(75) Inventors: Paul R. Cusson, West Hartford, CT (US); Michael G. Greenamyer, Salem, OH (US); Joseph A. Nobile, Boardman, OH (US); Thomas P. Kilar, Jr., Boardman, OH (US)

(73) Assignee: Northern States Metals Company, Youngstown, OH (US)

( * ) Notice: Subject to any disclaimer, the term of this patent is extended or adjusted under 35 U.S.C. 154(b) by 0 days.

(21) Appl. No.: 13/367,553

(22) Filed: Feb. 7, 2012

(65) Prior Publication Data

US 2012/0205508 A1 Aug. 16, 2012

Related U.S. Application Data

(60) Provisional application No. 61/441,830, filed on Feb. 11, 2011.

(51) Int. Cl.
| | | |
|---|---|---|
| E04D 13/18 | (2014.01) | |
| E04H 14/00 | (2006.01) | |
| F24J 2/52 | (2006.01) | |
| H01L 31/042 | (2014.01) | |
| H01L 31/048 | (2014.01) | |
| F16B 5/06 | (2006.01) | |

(52) U.S. Cl.
CPC ............... *F24J 2/5232* (2013.01); *Y02E 10/47* (2013.01); *H01L 31/0422* (2013.01); *Y02E 10/50* (2013.01); *H01L 31/0482* (2013.01); *F24J 2/5258* (2013.01); *F16B 5/0635* (2013.01); *Y02B 10/12* (2013.01)
USPC ........... 52/173.3; 52/460; 52/468; 52/506.06; 248/231.81

(58) Field of Classification Search
USPC ............... 248/231.81, 346.03, 346.04, 500; 52/173.3, 460, 464, 467, 468, 506.06, 52/220.3, 480, 483.1, 668, 669, 200, 52/730.4, 731.1, 731.54; 136/244, 251, 136/259; 126/621
See application file for complete search history.

(56) References Cited

U.S. PATENT DOCUMENTS

| 1,893,481 A | 1/1933 | Adams |
| 1,988,647 A | 1/1935 | Emerson |

(Continued)

FOREIGN PATENT DOCUMENTS

| CN | 1900458 A | 1/2007 |
| CN | 101095017 A | 12/2007 |

(Continued)

OTHER PUBLICATIONS

Krannich Solar, Inc. K-2 Systems, Mounting Systems for Solar Technology (7 pages); website http://cms.krannich-solar.com/usa/upload/pdf/K2/image_K2_USA_VIEW.pdfl; publication date unknown.

(Continued)

*Primary Examiner* — Nkeisha Smith
(74) *Attorney, Agent, or Firm* — Roth Blair Roberts Strasfeld & Lodge

(57) ABSTRACT

A panel array support assembly has lower support joists supporting varied panel rails, to which are connected panel holding device or clips. The panel clips are spring-based and configured so that the length of each clip extends in a direction along the length of the panel rails. The panels are supported well inside of the edges extending in the same direction as the panel rails.

9 Claims, 15 Drawing Sheets

(56) References Cited

U.S. PATENT DOCUMENTS

| | | | |
|---|---|---|---|
| 2,673,632 A | 3/1954 | Stiranka | |
| 2,938,068 A | 5/1960 | Silverschotz | |
| 3,028,938 A | 4/1962 | Schorr | |
| 3,062,339 A | 11/1962 | Geyser | |
| 3,092,932 A | 6/1963 | Wilson | |
| 3,210,716 A | 10/1965 | Meacham | |
| 3,261,086 A | 7/1966 | Dunn | |
| 3,844,087 A | 10/1974 | Schultz et al. | |
| 4,006,731 A | 2/1977 | Carroll | |
| 4,114,595 A | 9/1978 | Barker | |
| 4,146,785 A | 3/1979 | Neale | |
| 4,159,604 A | 7/1979 | Burrell | |
| 4,162,595 A | 7/1979 | Ramos et al. | |
| 4,258,963 A | 3/1981 | Fusselman et al. | |
| 4,269,173 A | 5/1981 | Krueger et al. | |
| 4,278,072 A | 7/1981 | Ryan et al. | |
| 4,328,789 A | 5/1982 | Nelson | |
| 4,418,506 A | 12/1983 | Weber et al. | |
| 4,426,999 A | 1/1984 | Evans et al. | |
| 4,452,027 A | 6/1984 | Desai | |
| 4,452,234 A | 6/1984 | Withjack | |
| 4,466,424 A | 8/1984 | Lockwood, Jr. | |
| 4,580,385 A | 4/1986 | Field | |
| 4,584,427 A | 4/1986 | Mackamul et al. | |
| 4,658,559 A | 4/1987 | Doherty | |
| 4,680,905 A | 7/1987 | Rockar | |
| 4,721,555 A | 1/1988 | Grosshandler | |
| 4,789,070 A | 12/1988 | Bennett | |
| 4,850,167 A | 7/1989 | Beard et al. | |
| 4,892,632 A | 1/1990 | Morris | |
| 4,930,493 A | 6/1990 | Sallis | |
| 4,966,631 A | 10/1990 | Matlin et al. | |
| 4,977,646 A | 12/1990 | McCraw | |
| 5,125,608 A | 6/1992 | McMaster et al. | |
| 5,143,556 A | 9/1992 | Matlin | |
| 5,228,258 A | 7/1993 | Onoda et al. | |
| 5,232,518 A | 8/1993 | Nath et al. | |
| 5,251,415 A | 10/1993 | Van Auken et al. | |
| 5,299,396 A | 4/1994 | Raap et al. | |
| 5,308,037 A | 5/1994 | Gonzalez | |
| 5,317,145 A | 5/1994 | Corio | |
| 5,487,791 A | 1/1996 | Everman et al. | |
| 5,546,713 A | 8/1996 | Voegele et al. | |
| 5,564,346 A | 10/1996 | Robben | |
| 5,632,823 A | 5/1997 | Sharan | |
| 5,634,644 A | 6/1997 | Guillon | |
| 5,664,874 A | 9/1997 | Winterer | |
| 5,706,617 A | 1/1998 | Hirai et al. | |
| 5,735,100 A | 4/1998 | Campbell | |
| 5,762,720 A | 6/1998 | Hanoka et al. | |
| 5,905,229 A | 5/1999 | McKitrick et al. | |
| 5,946,874 A | 9/1999 | Roberts | |
| 5,969,501 A | 10/1999 | Glidden et al. | |
| 5,979,364 A | 11/1999 | Ricketts | |
| 5,986,203 A | 11/1999 | Hanoka et al. | |
| 6,036,421 A * | 3/2000 | Demaray | 411/432 |
| 6,046,399 A | 4/2000 | Kapner | |
| 6,056,283 A | 5/2000 | Gage et al. | |
| 6,065,255 A | 5/2000 | Stern et al. | |
| 6,111,189 A | 8/2000 | Garvison et al. | |
| 6,141,923 A * | 11/2000 | Habicht et al. | 52/235 |
| 6,269,596 B1 | 8/2001 | Ohtsuka et al. | |
| 6,345,796 B1 * | 2/2002 | Neuman | 248/308 |
| 6,360,491 B1 | 3/2002 | Ullman | |
| 6,370,828 B1 | 4/2002 | Genschorek | |
| 6,389,770 B1 | 5/2002 | Santavicca | |
| 6,431,193 B2 | 8/2002 | Carter | |
| 6,501,013 B1 | 12/2002 | Dinwoodie | |
| 6,617,507 B2 | 9/2003 | Mapes et al. | |
| 6,672,018 B2 | 1/2004 | Shingleton | |
| 6,722,357 B2 | 4/2004 | Shingleton | |
| 6,784,359 B2 | 8/2004 | Clark et al. | |
| 6,799,398 B1 | 10/2004 | Plevyak | |
| 6,814,070 B2 | 11/2004 | Bourne et al. | |
| 6,920,721 B2 | 7/2005 | Johns et al. | |
| 6,959,517 B2 | 11/2005 | Poddany et al. | |
| 6,988,344 B1 * | 1/2006 | Krueger | 52/464 |
| 7,012,188 B2 | 3/2006 | Erling | |
| 7,082,685 B2 | 8/2006 | Crean | |
| 7,109,461 B2 | 9/2006 | Lasich | |
| 7,260,918 B2 | 8/2007 | Liebendorfer | |
| 7,307,209 B2 | 12/2007 | Mapes et al. | |
| 7,340,832 B2 | 3/2008 | Crean | |
| D565,505 S | 4/2008 | Shugar et al. | |
| 7,406,800 B2 | 8/2008 | Cinnamon et al. | |
| 7,434,362 B2 * | 10/2008 | Liebendorfer | 52/173.3 |
| 7,435,134 B2 | 10/2008 | Lenox | |
| 7,435,897 B2 | 10/2008 | Russell | |
| 7,476,832 B2 | 1/2009 | Vendig et al. | |
| 7,478,931 B2 | 1/2009 | Miletich et al. | |
| D586,737 S | 2/2009 | Shugar et al. | |
| 7,531,741 B1 | 5/2009 | Melton et al. | |
| 7,552,513 B2 | 6/2009 | Cheng | |
| 7,554,030 B2 | 6/2009 | Shingleton | |
| 7,557,292 B2 | 7/2009 | Shingleton et al. | |
| 7,600,350 B2 | 10/2009 | Braunstein | |
| 7,721,492 B2 | 5/2010 | Plaisted et al. | |
| 7,780,472 B2 | 8/2010 | Lenox | |
| 7,807,918 B2 | 10/2010 | Shingleton et al. | |
| 7,832,157 B2 | 11/2010 | Cinnamon | |
| 7,836,879 B2 | 11/2010 | Mackamul | |
| 7,845,120 B2 | 12/2010 | Thome et al. | |
| 7,866,098 B2 | 1/2011 | Cinnamon | |
| 7,888,587 B2 | 2/2011 | Shingleton et al. | |
| 7,888,588 B2 | 2/2011 | Shingleton | |
| 7,915,519 B2 | 3/2011 | Kobayashi | |
| 7,939,754 B2 | 5/2011 | Richter et al. | |
| 7,956,280 B2 | 6/2011 | Kobayashi | |
| 7,958,886 B2 | 6/2011 | Barsun et al. | |
| 7,987,641 B2 | 8/2011 | Cinnamon | |
| 8,037,658 B2 | 10/2011 | Kundel et al. | |
| 8,065,841 B2 | 11/2011 | Antonic | |
| 8,101,849 B2 | 1/2012 | Almy et al. | |
| 8,148,627 B2 | 4/2012 | Rose et al. | |
| 8,156,707 B2 | 4/2012 | Kundel et al. | |
| 8,158,877 B2 | 4/2012 | Klein et al. | |
| 8,176,693 B2 | 5/2012 | Abbott et al. | |
| 8,230,850 B2 | 7/2012 | Barnsun et al. | |
| 8,240,109 B2 | 8/2012 | Cusson et al. | |
| 8,245,459 B2 | 8/2012 | Belikoff et al. | |
| 8,245,549 B2 | 8/2012 | Zagoroff | |
| 8,256,169 B2 | 9/2012 | Cusson et al. | |
| 8,316,590 B2 | 11/2012 | Cusson | |
| 8,407,895 B2 | 4/2013 | Hartelius et al. | |
| 8,407,950 B2 | 4/2013 | Hartelius | |
| 8,413,312 B2 | 4/2013 | Hartelius et al. | |
| 8,413,388 B2 * | 4/2013 | Stearns et al. | 52/58 |
| 8,413,944 B2 * | 4/2013 | Harberts et al. | 248/500 |
| 8,413,946 B2 | 4/2013 | Hartelius et al. | |
| 8,418,983 B2 | 4/2013 | Hartelius et al. | |
| 8,418,984 B2 | 4/2013 | Hartelius et al. | |
| 8,555,576 B2 | 10/2013 | Falk | |
| 2002/0043812 A1 | 4/2002 | Crean | |
| 2002/0059948 A1 | 5/2002 | Carter | |
| 2002/0088905 A1 | 7/2002 | Hansen | |
| 2003/0015636 A1 | 1/2003 | Liebendorfer | |
| 2003/0019180 A1 | 1/2003 | Warren et al. | |
| 2003/0070368 A1 | 4/2003 | Shingleton | |
| 2003/0094193 A1 | 5/2003 | Mapes et al. | |
| 2003/0097806 A1 | 5/2003 | Brown | |
| 2003/0101662 A1 * | 6/2003 | Ullman | 52/27 |
| 2004/0025466 A1 | 2/2004 | Hink et al. | |
| 2004/0048022 A1 | 3/2004 | Pratt | |
| 2004/0163338 A1 | 8/2004 | Liebendorfer | |
| 2004/0221518 A1 | 11/2004 | Westra | |
| 2004/0231274 A1 | 11/2004 | Engstrom | |
| 2005/0072103 A1 | 4/2005 | Hopwood | |
| 2005/0103376 A1 | 5/2005 | Matsushita et al. | |
| 2005/0218657 A1 | 10/2005 | Weesner et al. | |
| 2006/0071437 A1 | 4/2006 | Blasco | |
| 2006/0156651 A1 | 7/2006 | Genschorek | |
| 2006/0174931 A1 | 8/2006 | Mapes et al. | |
| 2007/0069542 A1 | 3/2007 | Steiger et al. | |
| 2007/0102036 A1 | 5/2007 | Cinnamon | |

(56) References Cited

U.S. PATENT DOCUMENTS

| | | |
|---|---|---|
| 2007/0151594 A1 | 7/2007 | Mascolo et al. |
| 2007/0199196 A1 | 8/2007 | Crean |
| 2007/0251567 A1 | 11/2007 | Plaisted |
| 2008/0010915 A1 | 1/2008 | Liebendorfer |
| 2008/0016818 A1 | 1/2008 | Heirich |
| 2008/0053517 A1* | 3/2008 | Plaisted et al. ............... 136/251 |
| 2008/0087320 A1 | 4/2008 | Mapes et al. |
| 2008/0172935 A1 | 7/2008 | Feng |
| 2008/0172955 A1* | 7/2008 | McClintock et al. ........ 52/173.3 |
| 2008/0223262 A1 | 9/2008 | Chew et al. |
| 2008/0230047 A1 | 9/2008 | Shugar et al. |
| 2008/0236058 A1 | 10/2008 | Antonie |
| 2008/0264467 A1 | 10/2008 | Doko |
| 2008/0302407 A1 | 12/2008 | Kobayashi |
| 2008/0302928 A1 | 12/2008 | Haddock |
| 2009/0025708 A1 | 1/2009 | Shingleton |
| 2009/0025710 A1 | 1/2009 | Hogan |
| 2009/0031640 A1 | 2/2009 | Elmes et al. |
| 2009/0050191 A1 | 2/2009 | Young et al. |
| 2009/0056698 A1 | 3/2009 | Johnson et al. |
| 2009/0151775 A1 | 6/2009 | Pietrzak |
| 2009/0159075 A1 | 6/2009 | Mackamul |
| 2009/0205703 A1 | 8/2009 | Umotoy et al. |
| 2009/0230265 A1* | 9/2009 | Newman et al. ......... 248/229.11 |
| 2009/0256046 A1 | 10/2009 | Hausner et al. |
| 2009/0282755 A1 | 11/2009 | Abbott et al. |
| 2009/0302183 A1 | 12/2009 | Strizki |
| 2010/0071996 A1 | 3/2010 | Huang |
| 2010/0089389 A1 | 4/2010 | Seery et al. |
| 2010/0089390 A1 | 4/2010 | Miros et al. |
| 2010/0089433 A1 | 4/2010 | Conger |
| 2010/0127142 A1 | 5/2010 | Genschorek |
| 2010/0146899 A1 | 6/2010 | Zante |
| 2010/0193012 A1 | 8/2010 | Klammer et al. |
| 2010/0212715 A1 | 8/2010 | Almy et al. |
| 2010/0217566 A1 | 8/2010 | Wayne et al. |
| 2010/0217566 A1 | 8/2010 | Wayne et al. |
| 2010/0217639 A1 | 8/2010 | Wayne et al. |
| 2010/0217724 A1 | 8/2010 | Wayne et al. |
| 2010/0236183 A1 | 9/2010 | Cusson et al. |
| 2010/0237028 A1 | 9/2010 | Cusson |
| 2010/0237029 A1 | 9/2010 | Cusson et al. |
| 2010/0269446 A1 | 10/2010 | Merrifield |
| 2010/0307991 A1 | 12/2010 | Belikoff et al. |
| 2011/0072631 A1 | 3/2011 | Hartelus et al. |
| 2011/0114153 A1 | 5/2011 | Almy et al. |
| 2011/0120524 A1 | 5/2011 | Wares et al. |
| 2011/0139145 A1 | 6/2011 | Mackamul |
| 2011/0178641 A1 | 7/2011 | Judkins |
| 2011/0203637 A1* | 8/2011 | Patton et al. ................... 136/244 |
| 2011/0220180 A1 | 9/2011 | Cinnamon et al. |
| 2011/0220596 A1 | 9/2011 | Cusson et al. |
| 2011/0240006 A1 | 10/2011 | Linke et al. |
| 2011/0284058 A1 | 11/2011 | Cinnamon |
| 2012/0031862 A1 | 2/2012 | Belikoff et al. |
| 2012/0036717 A1 | 2/2012 | Belikoff et al. |
| 2012/0160234 A1 | 6/2012 | Wares et al. |
| 2012/0180845 A1 | 7/2012 | Cole et al. |
| 2012/0187058 A1 | 7/2012 | Almy et al. |
| 2012/0272613 A1 | 11/2012 | Cusson et al. |
| 2012/0298817 A1* | 11/2012 | West et al. ............... 248/220.22 |
| 2013/0006435 A1 | 1/2013 | Berrios et al. |
| 2013/0043199 A1 | 2/2013 | Cusson |
| 2013/0091786 A1* | 4/2013 | DuPont et al. ............... 52/173.3 |

FOREIGN PATENT DOCUMENTS

| | | |
|---|---|---|
| CN | 201014798 Y | 1/2008 |
| CN | 100424305 C | 10/2008 |
| CN | 101345269 A | 1/2009 |
| CN | 201188591 Y | 1/2009 |
| CN | 101387151 A | 3/2009 |
| CN | 201253369 Y | 6/2009 |
| EP | 0 993 051 A2 | 4/2000 |
| JP | 61199671 A | 9/1986 |
| JP | 02003534 A | 1/1990 |
| JP | 3212629 | 9/1991 |
| JP | 04146897 A | 5/1992 |
| WO | WO 97/19291 A1 | 5/1997 |
| WO | WO 2006/072230 A1 | 7/2006 |
| WO | WO 2008/124158 | 10/2008 |
| WO | WO 2008/145903 A1 | 12/2008 |
| WO | WO 2009/015424 A1 | 2/2009 |

OTHER PUBLICATIONS

First Solar Inc.; FS3X5 Installation Instruction Manual No. SD-2-02104001, Rev 1 (13 pages) with David Bobling Engineer CAD drawing (6 pages); website www.firstsolar.com; publication date unknown.

Scheltter Solar Mounting Systems Mounting and project planning, Scheltter Inc., Manual [online], Mar. 10, 2010 [retrieved on Oct. 31, 2011]. Retrieved from the internet: URL:http://www.schletter.us/support/Mounting%20and%20proj.

U.S. Appl. No. 14/173,005, filed Feb. 5, 2014, Cusson et al.

\* cited by examiner

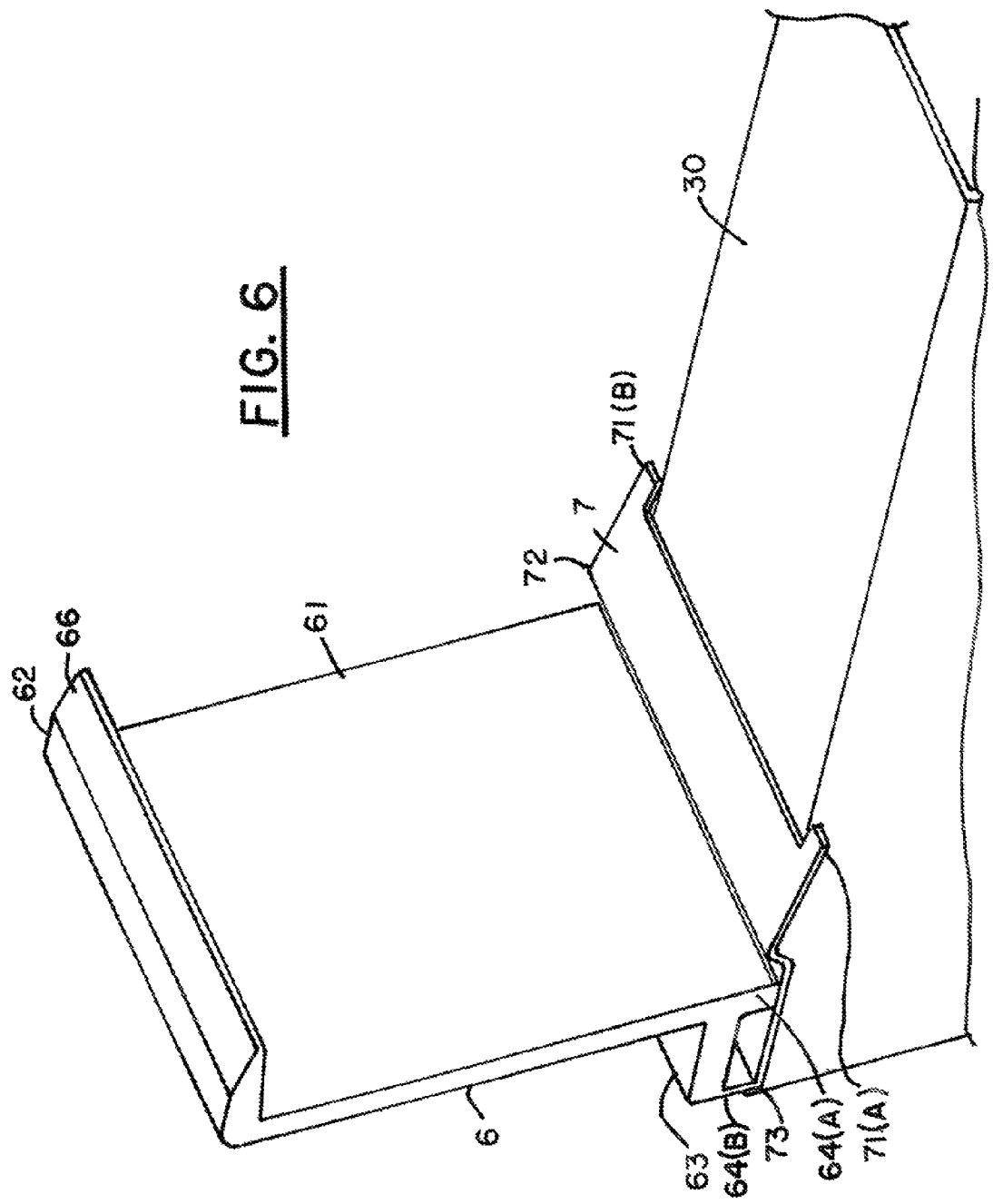

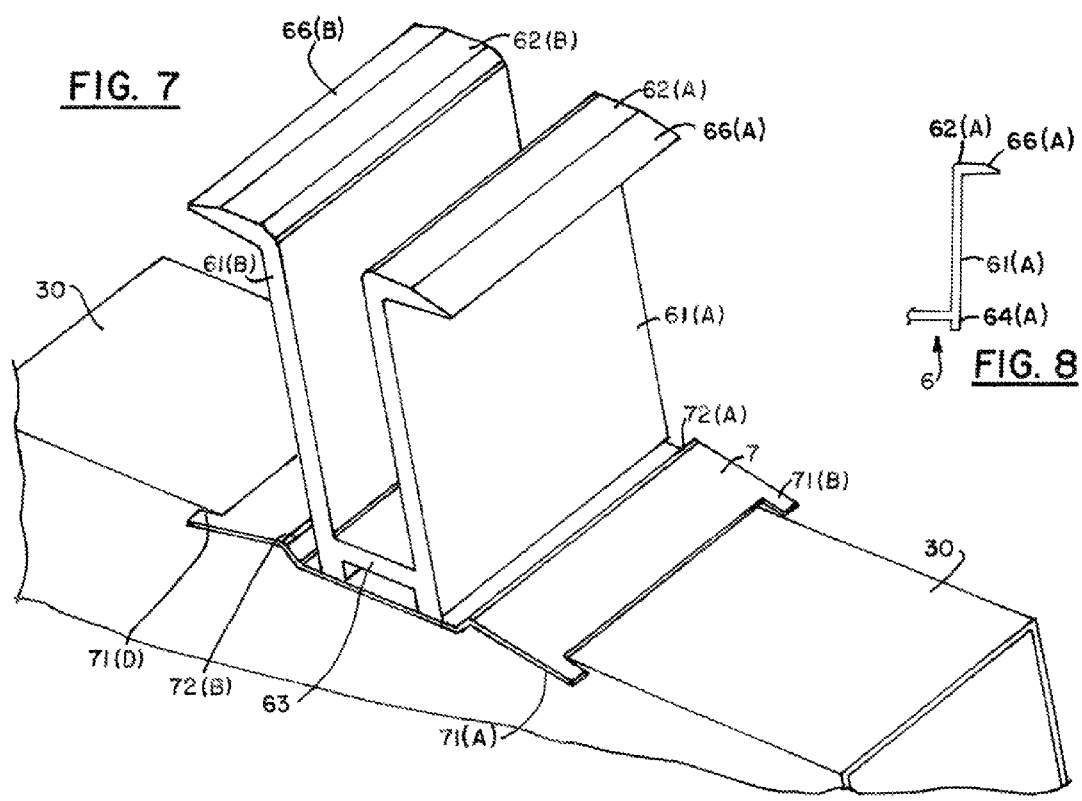

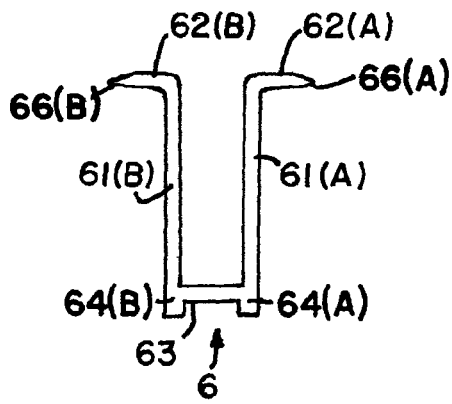
FIG. 9
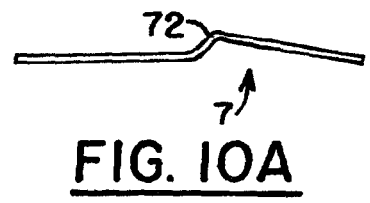
FIG. 10A
FIG. 10B
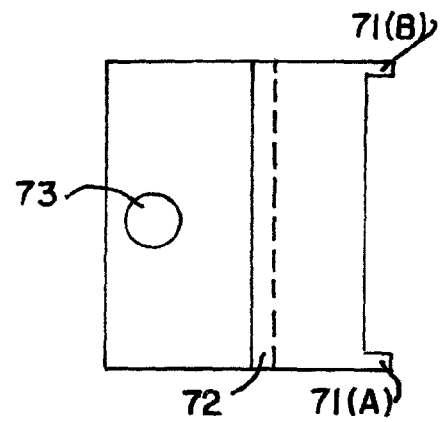
FIG. 11A
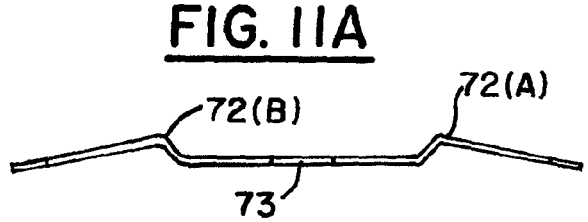
FIG. 11B
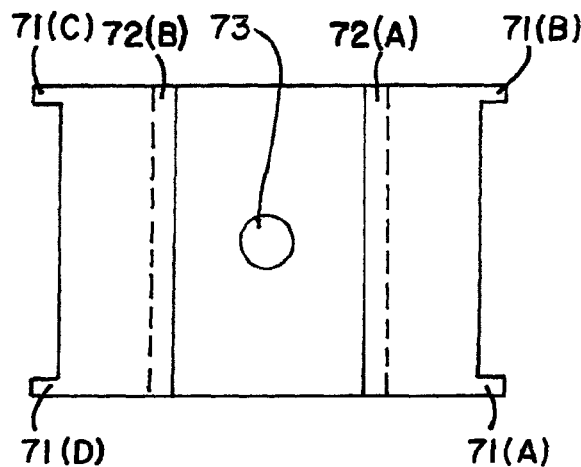

SPRING CLIP

PRIORITY INFORMATION

This application claims priority to U.S. Provisional Application No. 61/441,830, filed on Feb. 11, 2011. The entire subject matter of the provisional application is incorporated herein by reference.

FIELD OF THE INVENTION

This invention relates to support systems for panels and panel-like structures, such as solar energy collection systems, and more particularly to a support system for an array of photovoltaic panels, in addition to a method of quickly assembling the same for activation.

BACKGROUND OF THE INVENTION

Many conventional photovoltaic (solar) panel arrays include a plurality of solar panels, optimally arranged for converting light incident upon the panels to electricity. Various support systems are used for attachment to roofs, free-field ground racks, tracking units, or other substrates/structures. Typically, these support systems are costly, heavy, structurally inferior, mechanically complicated and the installation is labor-intensive. Once the support structure is in place, mounting the solar panels on the support structure can be very difficult. It is further complicated by the tendency of some large solar panels to sag and flex, thereby rendering the panel mounting unstable. Panel repair and adjustment thereby become more difficult.

A conventional two-dimensional panel support system generally includes off-the-shelf metal framing channels having a C-shaped cross-section, such as those sold under the trademarks UNISTRUT™ or BLIME™. These are improvised for use as vertical and horizontal (or upper and lower) support members. The photovoltaic (solar) panels 12, or other panel-like structures, are directly secured to upper support members (30 in FIG. 3) and held in place by panel clips or panel holders 45 (as depicted in FIG. 3). These panel clips are manufactured in a wide range of sizes and shapes. The clips 45 are conventionally positioned and attached about the panel edges once each panel is arranged in place.

In a conventional, free-field ground rack system for mounting solar panels, (as depicted in FIG. 1) vertical support elements, such as I-beams 14, are spaced and securely embedded vertically into the ground. Tilt-mounting brackets 16 are secured to the top of each I-beam, such that a tilt bracket flange extends above the I-beam at an angle, as best seen in FIG. 2A. In this arrangement, two UNISTRUT™ lower joists 20 or a combined support structure 13 span the tilt-mounting brackets 16 and are secured thereto, using bolts 240 through apertures 216 (FIG. 3). As seen in FIG. 2B, UNISTRUT™ rails 30 are positioned across and fastened to lower joists 20. To secure each rail 30 to the corresponding lower joists 20, a bolt through a bolt-hole made in the rail sidewall attaches to a threaded opening in a nut plate (not shown) inserted inside the channel of the UNISTRUT™ joist. The nut-like plate engages and tightly secures against the upper flange of the joist's C-channels as depicted in FIG. 2A.

Once the bi-directional matrix span 10 is assembled, each solar panel 12 is secured in place by panel holding clips 45 connected using apertures 145 in panel rails 30 (FIG. 4). A select quantity of said clips is secured to the upper support rails about the perimeter of each panel. Each panel clip 45 is put in place and securely tightened to support rails 30. This installation process, especially if involving multiple clips 45, is often costly, inaccurate, dangerous and time-consuming.

Another example of a support system for panel-like structures is shown in U.S. Pat. No. 5,762,720, issued to Hanoka et al., which describes various mounting brackets used with a UNISTRUT™ channel. Notably, the Hanoka et al. patent uses a solar cell module having an integral mounting structure, i.e. a mounting bracket bonded directly to a surface of the back-skin layer of a laminated solar cell module, which is then secured to the channel bracket by bolts or slideable, engaging C-shaped members. Other examples of panel support systems are shown in U.S. Pat. No. 6,617,507, issued to Mapes et al.; U.S. Pat. No. 6,370,828, issued to Genschorek; U.S. Pat. No. 4,966,631, issued to Matlin et al.; and U.S. Pat. No. 7,012,188, issued to Erling. All of these patents are incorporated herein as reference.

Foldable support arrays 10 of upper support rails 30 and lower support joists 20 are found in the newer art developed by some of the inventors of the present application. One such example is depicted in FIG. 4. A detailed view of the intersection between upper support rail 30 and lower support joist 20 is depicted in FIG. 5. Some of the present inventors have developed a number of foldable support systems for solar panels and other panel-like structures. These are listed in the attached information disclosure documents.

The folding support arrays 10 of these support systems solve many problems well known in the art of panel array supports. However, even with a reliable, easily-deployed support array, there are still difficulties in the installation of the panels themselves, especially solar panel arrays. In particular, existing support systems require meticulous on-site assembly of multiple parts, performed by expensive, dedicated field labor. Assembly is often performed in unfavorable working conditions, i.e. in harsh weather or in difficult terrain, without the benefits of quality control safeguards and precision tooling. Misalignment of the overall support assembly often occurs, especially when mounting panels to the upper panel rails 30 with clips 45. This can jeopardize the supported solar panels.

Another problem is the spacing of the photovoltaic (solar) panels 12. It is important to accommodate panel expansion and contraction as a result of changes in the weather. Panels must, therefore, be properly spaced for maximum use of the bi-directional area of the span. Various geographical areas may require different panel spacing due to the distinct temperature patterns of each given location. It is also challenging to precisely space the panels on-site using existing support structures and panel clips 45, without advanced (and expensive) technical assistance.

For example, with one of the existing conventional designs described above (as depicted in FIGS. 2A and 2B), until the upper rails 30 are tightly secured to the lower support structure 13 of multiple support joists 20, each upper rail 30 is free to slide along the lower support joists 20 and, therefore, needs to be properly spaced and secured once mounted on-site. Additionally, since the distance between the two lower joists 20 is fixed on account of the drilled bolt-holes through the bracket, it is conventionally preferred to drill the holes on-site, so that the lower joists can be precisely aligned and attached through the pre-drilled attachment holes of the tilt bracket. Unfortunately, the operation of drilling the holes on-site requires skilled workers, and even with skilled installation, misalignment of the support structure and/or the solar panels supported by the structure may still occur (i.e. improperly spaced or slightly skewed from parallel).

The difficulties are compounded by the necessity of drilling holes 145 to accommodate connectors for the panel clips or holders 45. If this process is executed on-site, accurate placement of the solar panels becomes extremely difficult. Even if the apertures 145 are precisely drilled at the factory, an additional degree of imprecision is introduced when the panel clips 45 have to be connected to the upper support rails 30 while being positioned to hold panels 12. This is an awkward arrangement, even in the hands of expert installers. Normally, it is accomplished by connecting one (lower) portion of the panel clip 45 to the upper support rail 30, and then positioning panel 12 to be secured by another (top) portion of panel clip 45. Of necessity, this adds an additional assembly step for each panel clip 45, while still offering opportunities to accidently introduce misalignment in the overall panel array 10.

FIG. 5 includes a cross-sectional view and shows an improved prior art arrangement for mounting a panel array. Panels 12 are held using gaskets 130 in panel clip 45. The panel clip is held to panel rail 30 using aperture 145, though which a connector (not shown) holds the panel clip 45 to the panel rail 30. The panel rail 30 is held to support joist 20 by means of threaded connector 43, which extends from the bottom of the panel rail 30 through separating washer 24, through support joist 20 and into tilt-mount bracket 16. The through connector 43 is held by nut 44. Despite the effectiveness of this particular arrangement, there are still difficulties to be addressed, as elaborated on below.

Misalignment difficulties are exacerbated by the flexing of the panels 12 and sagging permitted by the natural flexibility of the panels. The sagging of the panels 12 can cause the panels to work out of their clips or holders 45. Improper installation, which occurs frequently in conventional systems, can lead to dislocation of the panels due to sagging or atmospheric conditions. The use of a wide variety of different mounting positions and panel array arrangements also worsens the stability problems caused by panel sagging or deflection. Further, certain mounting positions will make the panels 12 more vulnerable to atmospheric disruptions, such as those created by wind and precipitation. All of these variables also complicate electrical connections to the panels.

One method of correcting misalignment is through the use of larger and more effective panel clips 45. However, there are drawbacks in this approach. In particular, there are only a limited number of points at which panel clips can be connected. Accordingly, even with enlarged panel clips 45, only extremely limited portions of the lengths of panels can be secured.

The problems caused by misalignment due to sagging are further exacerbated in some environments by the accumulation of ice on the panels. This adds weight. Icing can also be a problem, particularly when water works its way into crevasses found throughout the overall panel array 10, and then freezes and expands. Still further, icing can become particularly problematic with respect to panel clips 45 extending beyond the panels 12 or the support rails 30. Accordingly, the use of larger panel clips 45 and increased numbers of them have typically added to the problems of ice formation on the overall panel array 10.

Therefore, a need exists for a low-cost, uncomplicated, structurally strong panel support system, and assembly method, so as to optimally position and easily attach the plurality of photovoltaic panels, while meeting architectural and engineering requirements. Further, there is an urgent need for a panel support system that will maintain the security of the mechanical connections of the solar panels to support rails despite the flexing of the panels (and support structure) caused by any of gravity, vibration, or environmental factors. Likewise, there is an urgent need to simplify the assembly of panel support systems, especially the connections between the upper support rails and panel clips. Such simplification should not compromise the stability or strength of the connections between the panels and the support system.

Conventionally, solar panels are supported at two opposite edges of the panel along the entirety of the panel length. This type of edge support, while convenient, permits panel buckling and loosening, as previously described. This in turn necessitates adjustments in the panel holding structures, which are often not successful since they are conventionally limited to two edges of the panel. An arrangement in which panels could be supported at positions other than two edges could eliminate many problems resulting from panel buckling, sagging, and loosening.

At present, none of the conventional panel support systems offer the capabilities of eliminating the problems mentioned above. An improved support system would achieve a precise configuration in the field without extensive work at the installation site. The use of such an improved system would facilitate easy, secure placement of solar panels onto the support structure prior to the final tightening of the panel clips. The shipping configuration of the improved support system would be such so as to be easily handled in transit while still facilitating rapid deployment.

Rapid deployment must be facilitated on any type of substrate providing stable support for the panels, without damaging or otherwise compromising the panels or substrate. Rapid deployment would also include rapid and secure mechanical connection of the panels using simple panel clips in a manner that would keep the panels secure despite loosening tendencies from panel sagging and flexing, or any number of other factors. Final panel clip tightening would not be necessary until all panels were in place. The preferred system would also minimize ice accumulation on the panel array, especially at the panel clips.

SUMMARY OF THE INVENTION

It is a primary object of the present invention to improve upon conventional photovoltaic solar panel systems, especially with regard to assembly and installation.

It is another object of the present invention to provide a support and installation system for solar panels in which the panels are less likely to be damaged during installation.

It is a further object of the present invention to provide a simplified support system for solar panels that is easily installed while still facilitating a precise configuration.

It is an additional object of the present invention to provide a solar panel support system that can be assembled very quickly on site, due to fewer assembly steps.

It is still another object of the present invention to provide a solar panel support system that can achieve close tolerances during field installation, without the necessity of skilled on-site labor.

It is still an additional object of the present invention to provide a solar panel support system which can be easily adapted to a wide variety of solar panel array sizes and shapes.

It is yet another object of the present invention to provide a solar panel support system which minimizes the necessity for precise measurements at the installation site.

It is again a further object of the present invention to provide a solar panel support system that can be arranged in a variety of different positions and at varying exposure angles.

It is still an additional object of the present invention to provide a solar panel support system that can be precisely configured to a specific environment.

It is another object of the present invention to provide a support system for solar panels and other panel-like structures in which degradation caused by metal-to-metal contact is substantially reduced.

It is again another object of the present invention to provide a support system for panel-like structures in which accommodation is made for movement caused by changes in temperatures, humidity or other environmental considerations.

It is still a further object of the present invention to provide a simplified connection system for solar panels using a reduced number of parts.

It is still an additional object of the present invention to provide a solar panel mounting system that can accommodate easy installation and removal of panels on adjacent frameworks.

It is still another object of the present invention to provide a panel support system wherein a wide variety of different sizes and shapes of panel configurations can be accommodated, and easily installed, as well as removed.

It is again a further object of the present invention to provide a panel support system in which panels can be easily attached to support brackets without incurring damage to the panels.

It is still another object of the present invention to provide a support system for panels or panel-like structures for a wide range of uses, positions, and configurations.

It is still a further object of the present invention to provide a panel mounting system, which is entirely self-contained with its own installation interface.

It is again an additional object of the present invention to provide a panel mounting system that facilitates quick, secure mounting of the panels once the support system is deployed.

It is yet another object of the present invention to provide a panel support system that can accommodate flexing, sagging, and other deformation of the panels while maintaining a secure connection thereto.

It is yet a further object of the present invention to provide a panel mounting system which facilitates increased panel clip capacity.

It is again an additional object of the present invention to provide a panel mounting system that facilitates safe tightening of panel clips.

It is yet another object of the present invention to provide a panel clip or connector that can accommodate for flexing of both the panel and the support system.

It is still a further object of the present invention to provide a panel connection system that can facilitate rapid installation while maintaining a secure hold on the panels or panel-like structures.

It is yet an additional object of the present invention to provide panel rails configured to ensure a secure panel connection, without final tightening of all the panel clips.

It is yet a further object of the present invention to reduce the cost of panel support structures by eliminating the overall length of structural aluminum panel rails, such as those currently used in conventional systems, without sacrificing the strength of the overall structure.

It is still an additional object of the present invention to provide a panel support system admitting to substantial flexibility of configuration.

It is again another object of the present invention to provide a panel support system which limits ice formation at various parts of the panel array, especially the panel clips.

It is again a further object of the present invention to provide a panel support system having a profile which limits or avoids overhanging structures extending from the supported panels.

It is again another objection of the present invention to provide a panel support system that accommodates folding for transport.

It is again an additional object of the present invention to provide a panel support system, including panel clips, that is not susceptible to loosening or allowing panels to shift.

It is still another object of the present invention to provide a panel support system in which conditions for standing water accumulation are drastically reduced, as is ice accumulation.

It is yet a further object of the present invention to provide a panel support system that facilitates superior support of panels to avoid sagging.

It is again another object of the present invention to provide a panel support system in which panels are held by quick-connect/quick-release spring mechanisms.

It is the overall goal of the present invention to provide a comprehensive panel mounting system that facilitates rapid and secure installation, including deployment of the panel support structure, and placement of the panels on that support structure.

These and other goals and objects of the present invention are achieved by a panel holding clip configured to hold at least one panel to an upper panel rail in a panel support array. The panel holding clip includes a base structure having a horizontal support extending along the upper panel rail. The panel holding clip also includes a first upright structure extending perpendicularly from the base structure and having a distal end. A first perpendicular holding structure extends horizontally from the distal end of the upright structure. A spring structure is positioned to exert force on an external panel held by the panel holding clip.

BRIEF DESCRIPTION OF THE DRAWINGS

Having generally described the nature of the invention, reference will now be made to the accompanying drawings used to illustrate and describe the preferred embodiments thereof. Further, the aforementioned advantages and others will become apparent to those skilled in this art from the following detailed description of the preferred embodiments when considered in light of these drawings, in which:

FIG. 6 is a front perspective view of a single-sided panel clip.

FIG. 7 is a front perspective view of a double-sided panel clip.

FIG. 8 is a side view of the panel clip of FIG. 6.

FIG. 9 is a side view of the panel clip of FIG. 7.

FIG. 10A is a side view of a spring structure underlying a single-ended panel clip.

FIG. 10B is a top view of the spring structure of FIG. 10A.

FIG. 11A is a side view of a double-spring structure underlying the clip of FIG. 7.

FIG. 11B is a top view of the spring structure of FIG. 11A.

DESCRIPTION OF THE PREFERRED EMBODIMENTS

Figure 1:
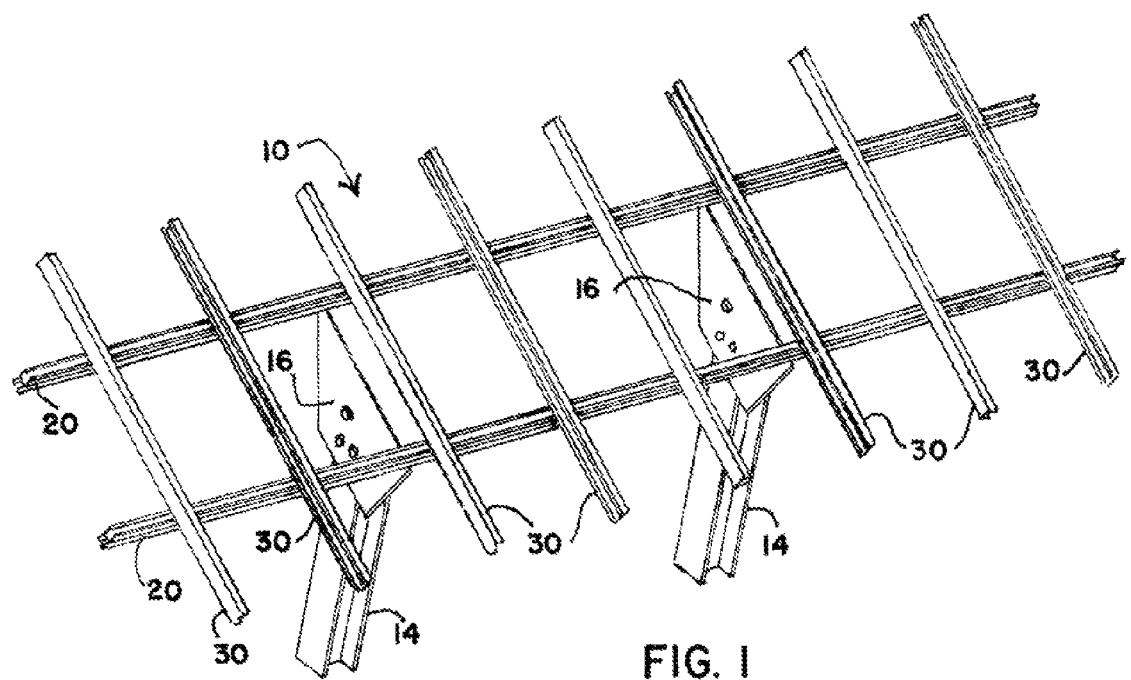
FIG. 1 is a perspective view of an assembled conventional field ground rack support system for securing a plurality of solar panels.
Figure 2A:
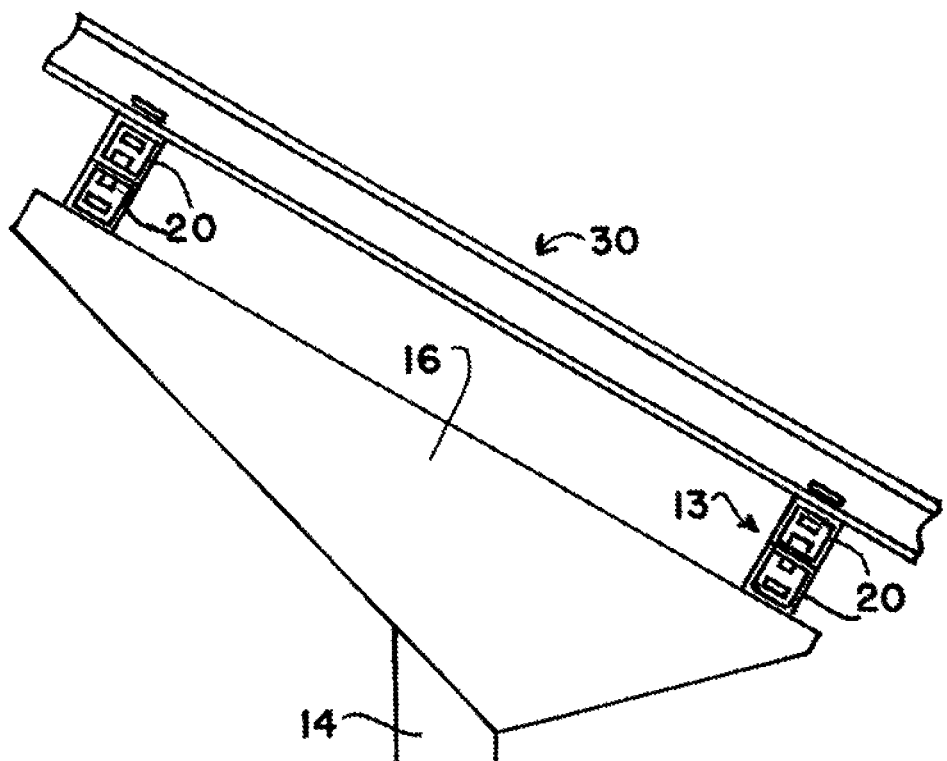
FIG. 2A is a side view of a conventional tilt bracket mount with prior art C-shaped sectional channels secured back-to-back to form support joists to which upper support rails, also shown in FIG. 2B, are secured.
Figure 2B:
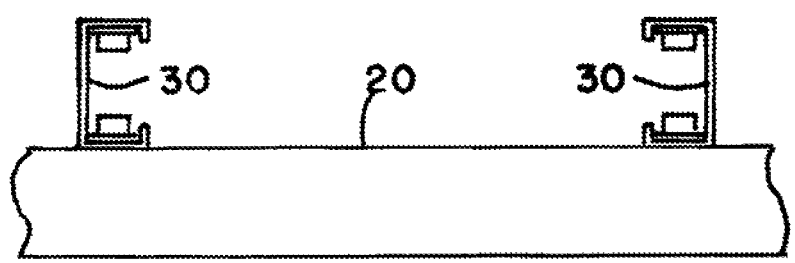
FIG. 2B shows an end view of prior art upper support rails, each with a C-shaped sectional channel.
Figure 3:
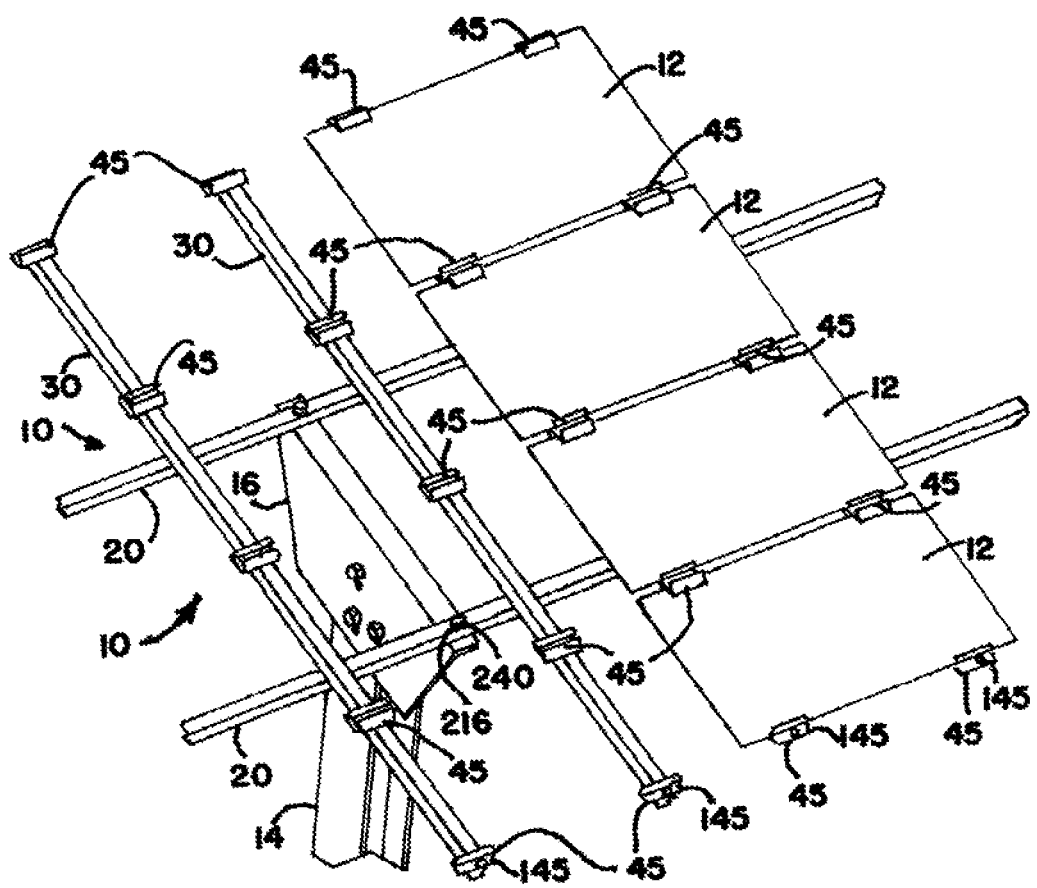
FIG. 3 is a perspective view of a previously-disclosed support system in a configuration as used with solar panels arranged in a column and in spaced relationship thereon.
Figure 4:
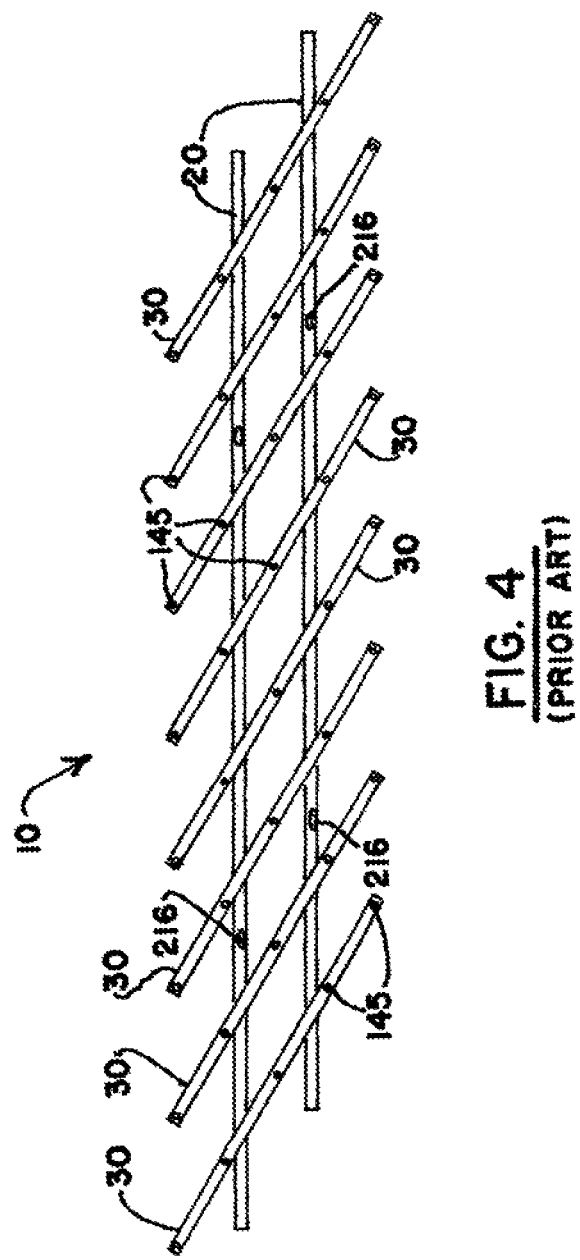
FIG. 4 is a top view illustrating the bi-directional support frame collapsed to an intermediate folded position.
Figure 5:
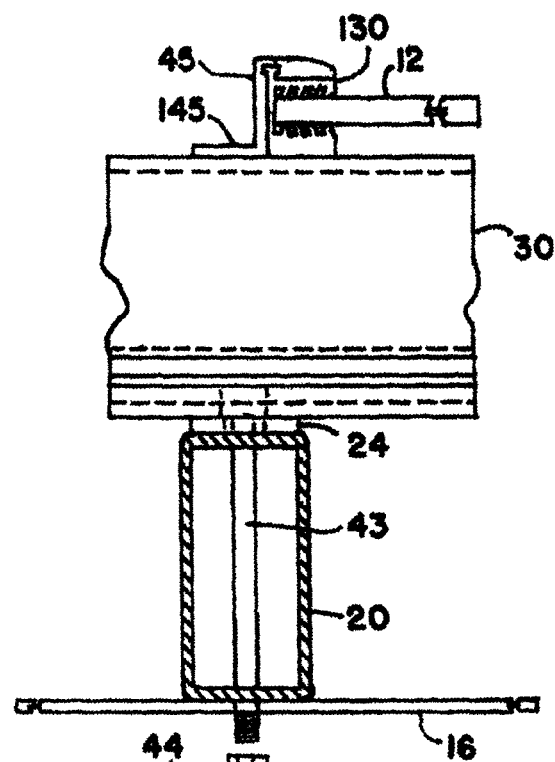
FIG. 5 is an end elevation and partial sectional view depicting a conventional arrangement of a lower support joist, and upper panel rail, with a panel clip.

As has been previously discussed, conventional panel (solar and other types) support systems tend to be constituted by two dimensional arrays having lower support joists 20 and upper support rails 30. Panel clips or holders 45 are then field-mounted on the upper support rails so that the panels 12 can be placed thereon, and secured with additional portions of the clips. Even with factory pre-alignment and set up of support joists 20 and upper panel rails 30, conventionally, there is little that can be done about the many assembly steps required to place both the panel clips 45 and the panels 12 on the upper support rails 30.

The present inventions, as depicted in FIGS. 6-18, constitute a departure from the prior arrangements. In particular, panel clips 6 still hold panels 12 along their edges. However, panel rails 30 are not found along the longitudinal (parallel to the length of the panel rails) edges of the panels 12. Rather, the panel rails 30 support panels 12 at positions well inside of the edges of the panels 12. This results in far superior support for the panels 12 than can be found in any of the other conventional arrangements used for supporting solar panel arrays. This is clearly seen in FIGS. 15-18. This novel support arrangement prevents a substantial amount of the sagging, twisting, warping, and loosening of the panel clips found in conventional solar panel support systems.

Figure 17:
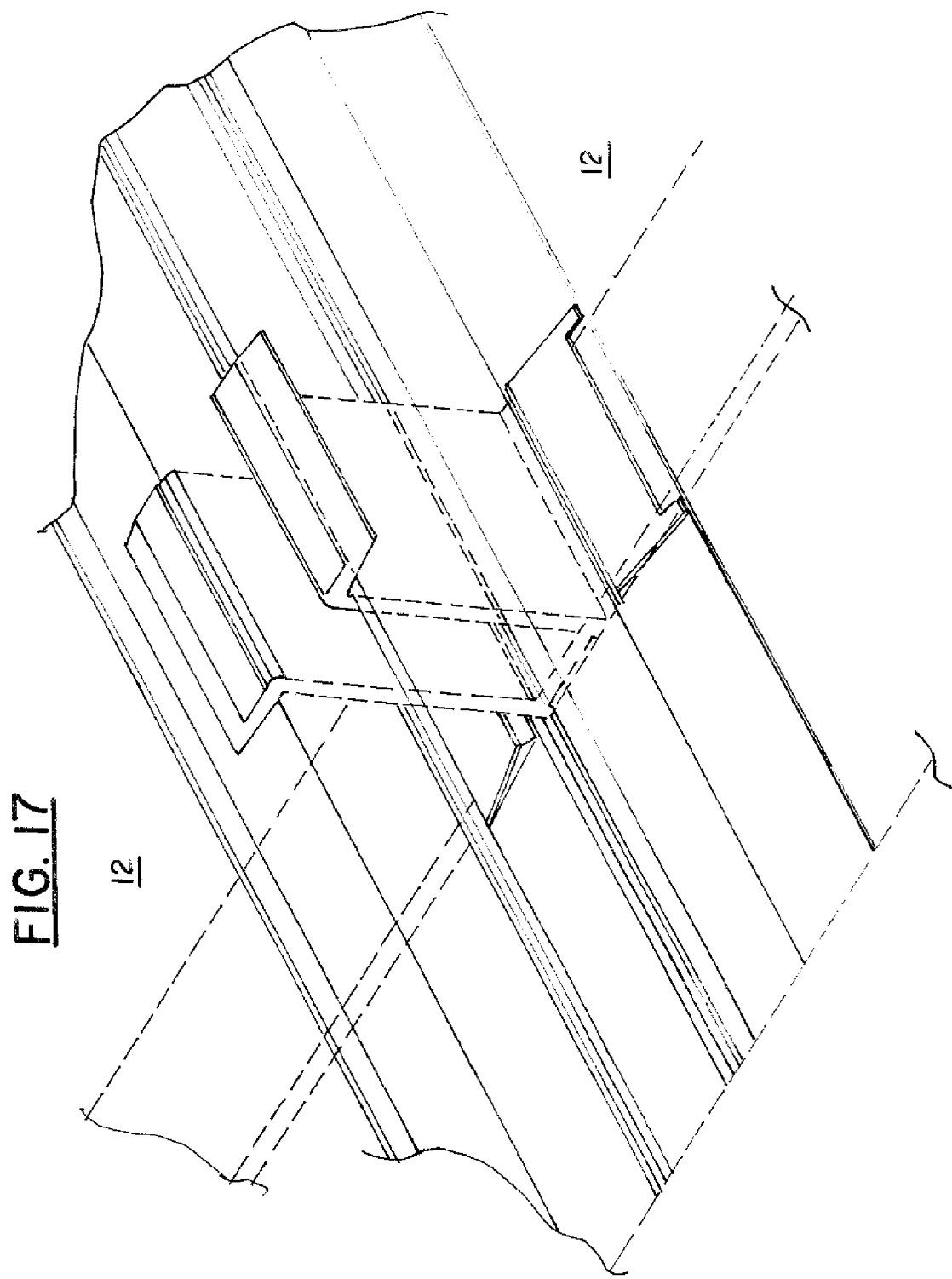
FIG. 17 is a perspective view of the double panel clip of FIG. 7 holding two adjacent panels in a novel support arrangement.
Figure 18:
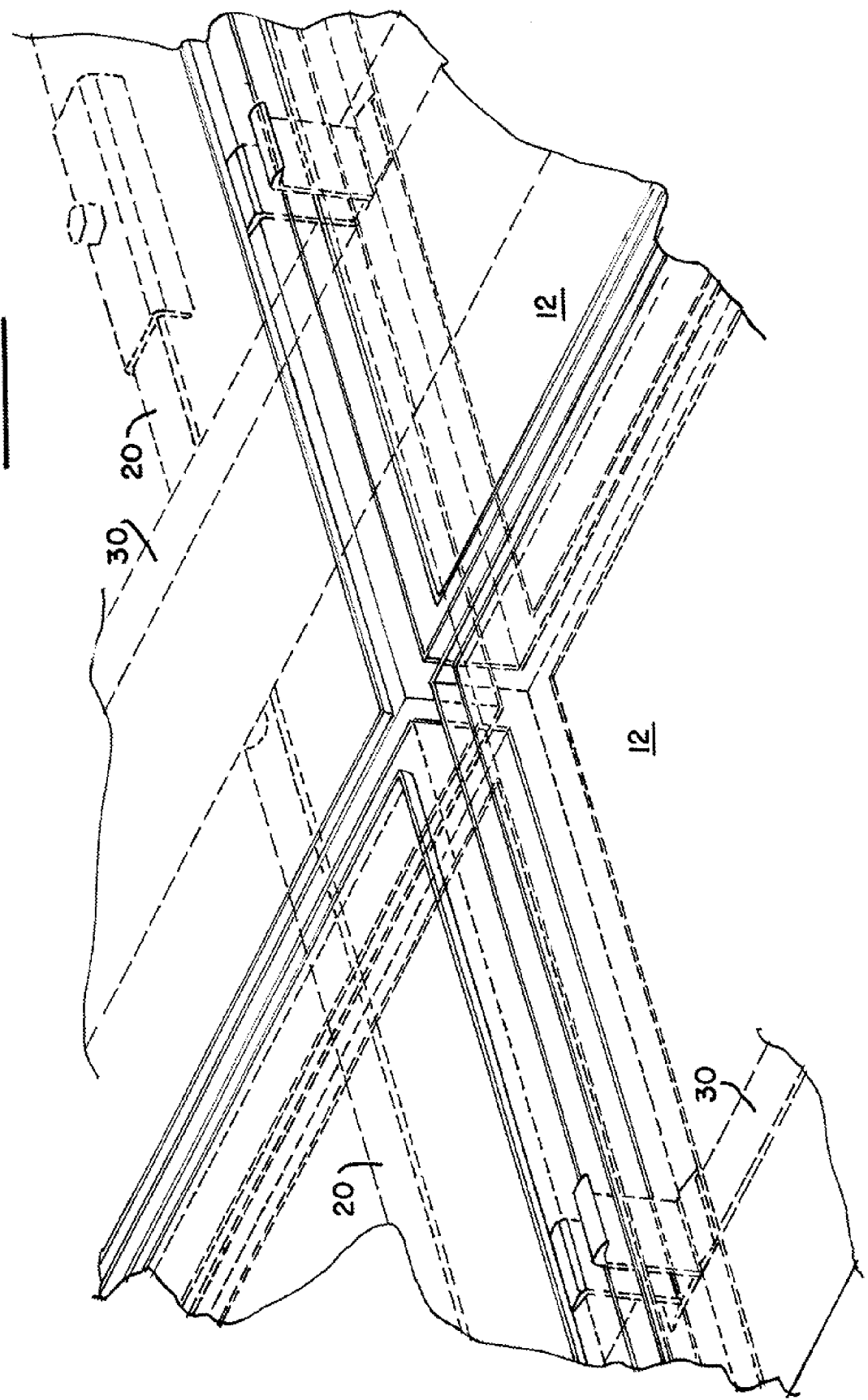
FIG. 18 is a perspective view depicting the panel support array of lower support joists, upper panel rails, and panels supported using the panel clips of FIG. 7 in a new support configuration.

Panels 12 are supported and held by clips 6 only at the ends of the panels 12, as depicted in FIGS. 6-18. Because the panel rails 30 are covered along most of their lengths by panels 12, the panel clip 6 can be installed only at the ends of the panel rails 30, or at gaps between panels 12, as depicted in FIGS. 17 and 18.

The holding capability of panel clips 6 is enhanced by spring-biased structures 7 that apply additional force against panels 12 to hold them in place. Despite the fact that additional spring force is provided by the spring-biased mechanisms (such as spring structure 7), the panels 12 are easier to install due to the flexibility provided by the spring mechanisms. Because of the spring action, panels 12 can be easily slid into panel clips 6 that are already secured to the panel rails. This spring action provides enough flexibility that panels 12 can be adjusted beneath secured panel clips 6, without damage to the panel 12, or extensive loosening and tightening operations.

The new mounting configurations depicted in FIGS. 6-18 also provide superior de-icing characteristics. This is achieved by allowing considerably fewer surfaces or structures on which water can accumulate. For example, since sagging is eliminated from panels 12, water cannot accumulate on them, thereby eliminating the formation of ice deposits and/or the build-up of excessive and unnecessary weight.

Also, the narrow profiles of each of the clips 6 provide very little structure that is conducive to the accumulation of water and the formation of ice at the intersections of the panel clips 6 and other structures. With reference to FIGS. 6 and 7, each perpendicular holding structure 62, 62(A) and 62(B) has a corresponding beveled surface 66, 66(A) and (B), respectively, to help prevent the accumulation of water at the intersection between the clip 6 and the panel 12. The arrangement whereby the edges of most of the panel are free from an intersection with a panel rail 30 reduces opportunities for water accumulation and ice formation.

Further, the width of the panel clip 6 is such that the panel clip 6 is a bit wider than the width of the panel rail 30. This prevents water collection, as well as the opportunity for ice formation, at the intersection or interface between panel clip 6 and panel rail 30.

For the most part, when water flows toward the edges of panel 12, it is not held by intersections of surfaces from the side of panel 12 and the upper edge of panel rail 30. Accordingly, the water simply slides off the open edges of panel 12. Even one embodiment of spring structure 7 is arranged so that water will flow off the surface of panel rail 30 (by means of legs 71(A), 71(B)).

The first embodiment of the novel panel clips 6 is depicted in FIG. 6. This is a front perspective view of a single-sided panel clip 6 facing in the direction of the panel 12 edge, which is to be held. The surface against which the panel edge will interface is provided by upright structure 61. This, in turn, supports a perpendicular holding structure 62, which is configured to extend over the surface of panel 12 (not shown). Panel clip 6 is supported by legs 64(A) and (B) and horizontal support or cross piece 63. The cross piece provides structural support for a connector aperture 65, through which a connector 9 (in FIG. 12) can be inserted to hold panel clip 6 to the top of panel rail 30.

Spring structure 7 is made of a flexible, deformable material, and includes a ridge structure 72. Pressure on ridge 72, for example from a panel 12 (not shown in FIG. 7), will serve to deform ridge 72 so that the panel can fit under perpendicular holding structure 62. Because the material constituting spring structure 7 is resilient, ridge 72 will continue to exert force against panel 12 (not shown), serving to hold it tightly in place. Legs 71(A), 71(B) are operative to prohibit lateral movement to both the spring structure 7 and the panel clip 6.

For the sake of design and arrangement flexibility, a double panel clip 6 constitutes another embodiment of the present invention, as depicted in FIG. 7. The double panel clip 6 is the same as a single panel clip 6, except that a second upright structure 61(B) is included. The side profile of the double panel clip 6 arrangement is depicted in FIG. 9, which can be easily compared to the single-side profile of FIG. 8.

The only difference in the two-sided spring structure 7 arrangement is found in the comparison of the structures depicted in FIG. 10(A-B) and FIG. 11(A-B). In particular, first and second ridge 72(A) and (B) are found with the double-ended arrangement. This permits a second panel 12 (not shown) to be inserted beneath the second perpendicular holding structure 62(B). In both configurations of the spring structure 7, a connector aperture 73 is placed to align with the connector aperture 65 in the horizontal support structure 63 of panel clip 6.

The double panel clip 6 structure of FIGS. 7, 9, 11(A), 11(B) and 13 also includes a spring structure 7 having an additional set of legs, 71(C), 71(D). Just as there is a second upright structure 61(B), there is also a second perpendicular holding structure 62(B) with its own beveled edge 66(B).

Because the spring structure 7 has a double-ridge arrangement, 72(A), 72(B), two external panels 12 can be held by virtue of the spring action exerted by ridges 72(A), 72(B), before the final tightening of connector 9 is carried out. This greatly aids in the rapid installation of panels, a major object of the present inventive system.

Figure 12:
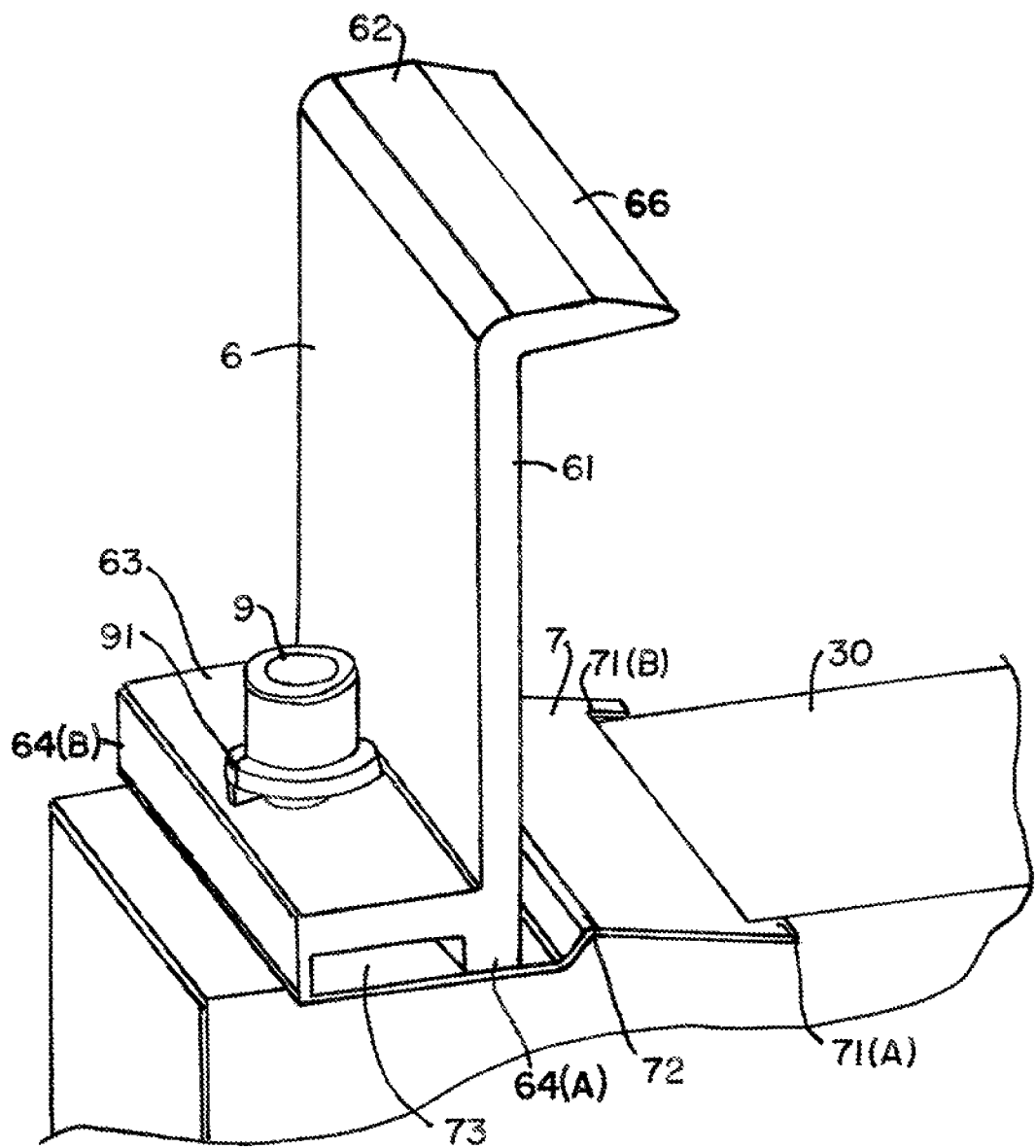
FIG. 12 is a rear perspective view of the panel clip of FIG. 6, depicting the connector used to hold the panel clip to the panel rail.
Figure 13:
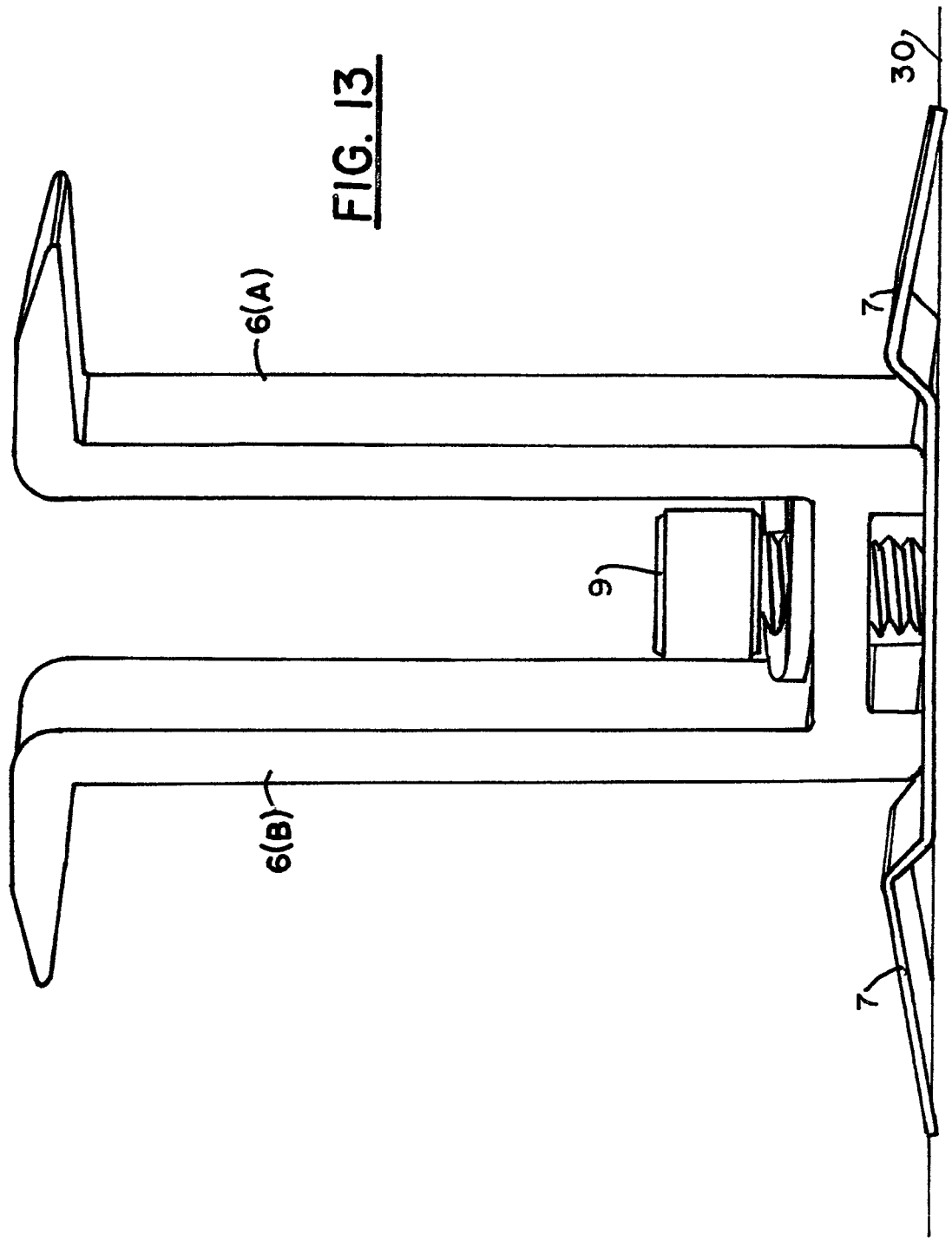
FIG. 13 is a side perspective view of the panel clip of FIG. 7.

FIGS. 12 and 13 depict through-connector 9 (preferably a threaded screw) holding both single and double panel clips 6, 6(A) and (B), respectively, onto the surface of a panel rail 30. The security of connector 9 is facilitated by lock washer 91. However, other connection techniques can be used besides the configuration of connector 9 and lock washer 91 depicted in FIGS. 12 and 13.

Spring action to hold panels 12 can be applied by other mechanisms besides the precise spring structure 7 depicted in FIGS. 6-13. For example, in FIGS. 14 and 15, spring pressure is applied to panel 12 through the perpendicular holding structure 62 of clip 6. The spring action comes from a resilient bushing 8, which functions as a spring. This spring action allows the Z-shaped clip 6 to exert varying levels of pressure on a panel 12 through the perpendicular holding structure 62. The level of spring action is adjusted by connector 9 operating through collar 81 on resilient member 8.

Figure 14:
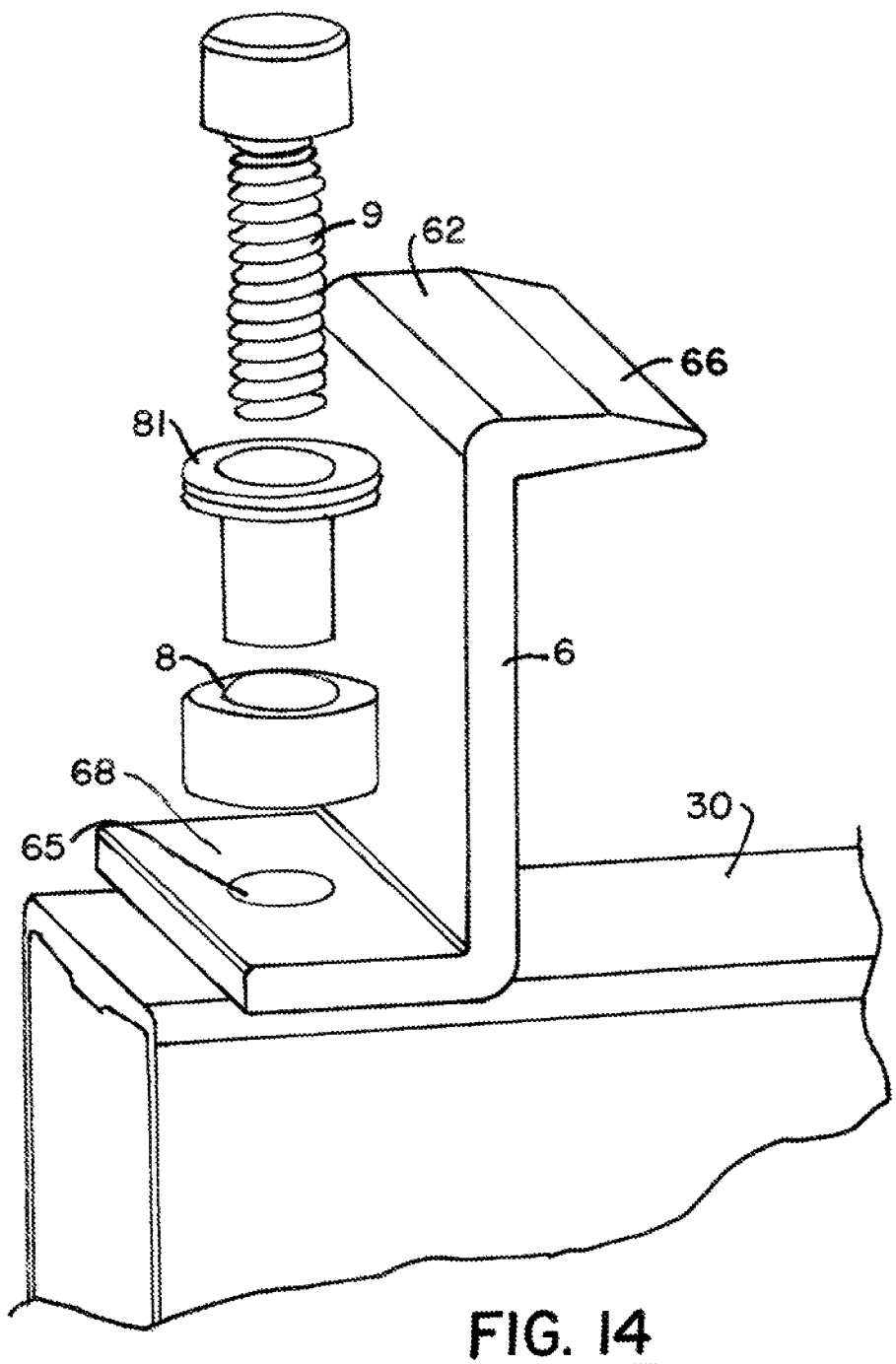
FIG. 14 is a rear perspective drawing depicting an exploded view of an alternative spring structure for a panel clip.
Figure 15:
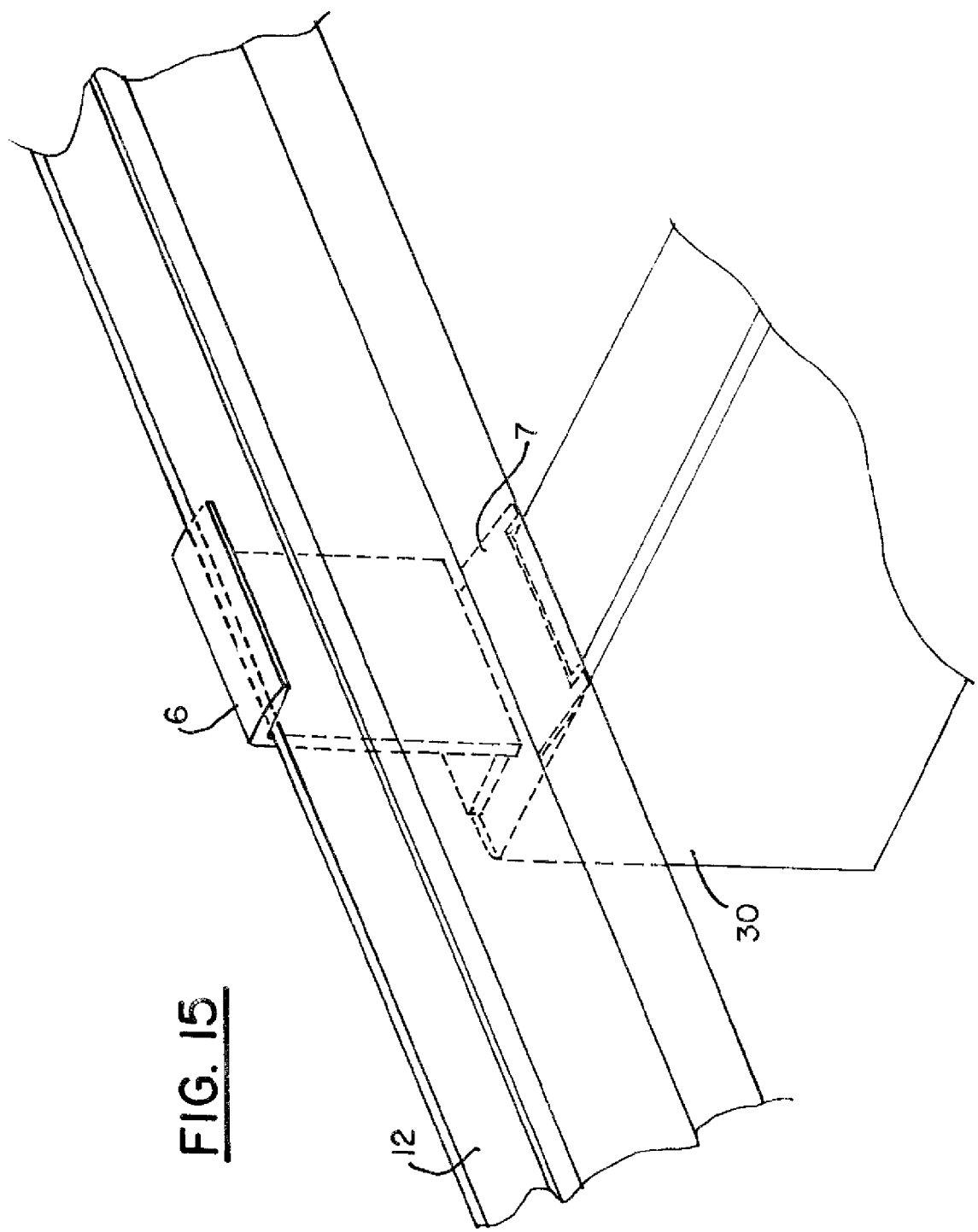
FIG. 15 is a front perspective view of the panel clip of FIG. 6 holding a panel to a panel rail in a new support arrangement.
Figure 16:
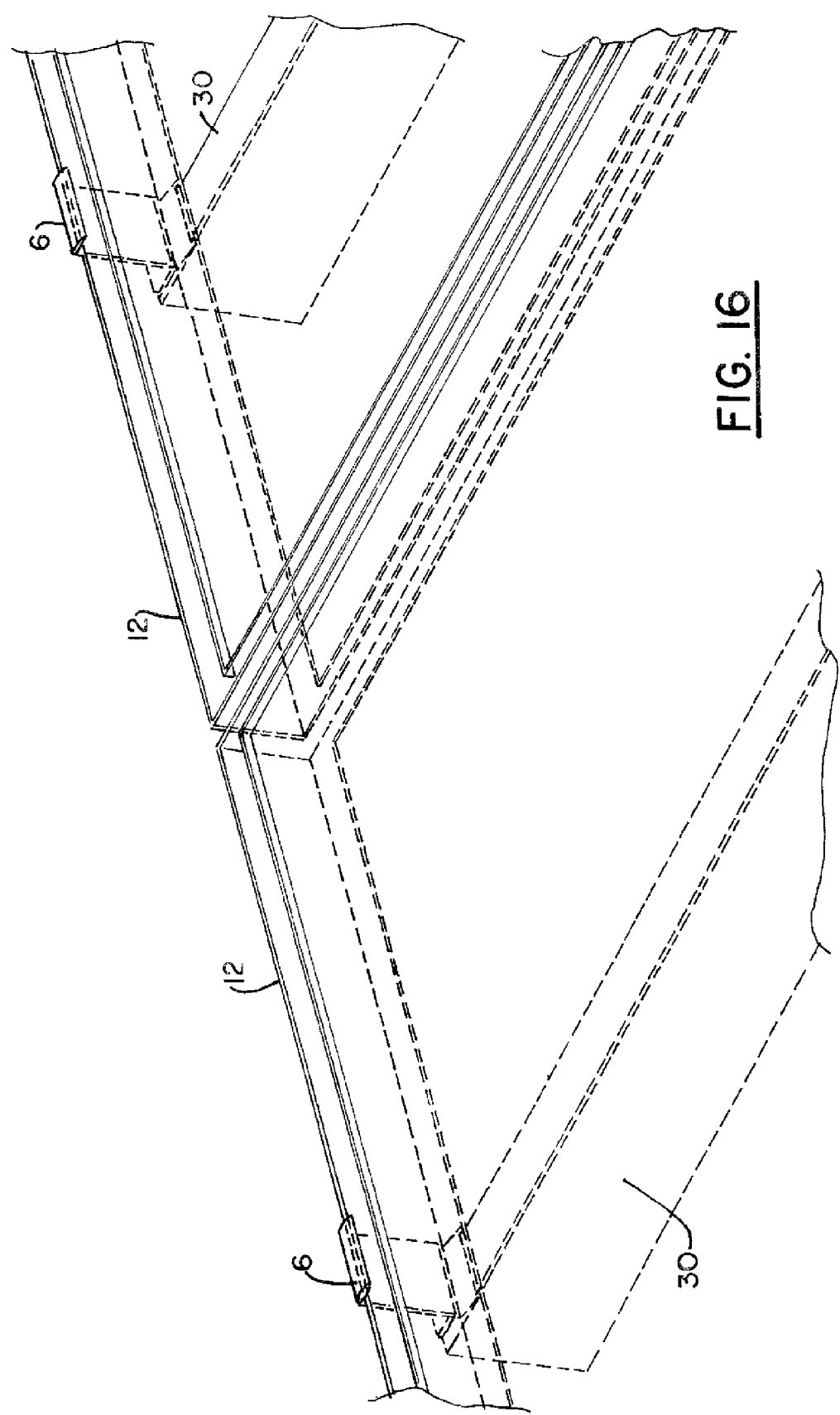
FIG. 16 is a perspective view depicting multiple panels being held by the panel clip of FIG. 6 in a new support configuration.

Panel clip 6, shown in FIGS. 14-15, is similar to those in FIGS. 6-13 with certain exceptions. For example, the panel clips of FIGS. 14 and 15 are Z-shaped, with a flat horizontal flange 68, having a connector aperture 65. Horizontal flange 68 lies flat on panel rail 30. Like previous embodiments, the width of the clip 6 is somewhat greater than the width of rail 30 so that the opportunities for water accumulation, and thus ice formation, are limited.

Resilient member 8 is preferably a spring or a resilient bushing (the bushing being made of polyurethane or a similar resilient material that exhibits a spring-like quality) so that there is flexibility in the overall holding arrangement of panel clip 6, as depicted in FIG. 14. The spring tension exerted by resilient member 8 is controlled by collar 81, which presses down uniformly on the top of resilient member 8. The overall tension is controlled by connector 9, which passes through collar 81, resilient member (i.e., bushing or spring) 8, connector aperture 65, and into panel rail 30.

FIGS. 15-18 depict various embodiments of the present invention holding panels 12 to panel rails 30. Other than the use of the inventive panel clip 6 configurations, the arrangement of FIGS. 15-18 differs substantially from support arrangements for conventional solar panels.

Considering all of FIGS. 15-18, it is important to note that panels 12 are not supported along their outer edges, as is the case with conventional panel support arrangements. Rather, the lengths of panel rails 30 run along the interior of panels 12, as depicted most clearly in FIGS. 16 and 18. As depicted in these drawings, the edges of the panels are not supported along their lengths by panel rails 30. The result is that water is free to flow down between the panels 12, and does not accumulate and/or form ice in freezing conditions. This is crucial in reducing the weight of the panel array over time.

Further, because panels 12 are supported away from their edges, sagging in the middle of the panels is virtually eliminated. This is crucial since sagging often results in water accumulation and ice formation. The elimination of sagging also eliminates twisting, warping, and the like. These are factors that tend to tear panels loose from the panel clips. The result of the arrangements of FIGS. 15-18, when used in conjunction with the panel clips of FIGS. 6-14, is a far more stable panel array. Because such a panel array resists the accumulation of water (normally resulting in extra weight), the array is far more stable over the course of time.

Since panels 12 are not held along their entire edges, handling of the panels becomes much easier. Supporting the panels as described (i.e., closer to the middle of the panels and at two places) results in not only a more stable configuration, but also one that is easier to maintain, as the handling of panels for maintenance and replacement can be carried out much more easily and efficiently.

While a number of preferred embodiments have been described by way of example, the present invention is not limited thereto. Rather, the present invention should be understood to include any and all variations, modifications, adaptations, permutations, derivations, and embodiments that would occur to one skilled in this art in possession of the teachings of the present invention. Accordingly, the present invention should be construed to be limited only by the following claims.

We claim:

1. A bi-directional panel support array including a plurality of separate, individually attachable panel clips holding at least one external panel to a plurality of upper panel rails, each rail having a single planar upper surface with a plurality of discrete apertures, each aperture is sized to accommodate a through connector, said plurality of separate, individually attachable panel clips being spaced along a perimeter of said at least one panel, at least one said separate, individually attachable panel clip comprising:
   a) a base structure having a horizontal support extending along a length of the upper surface of one of said upper panel rails, wherein said base structure further comprises a pair of substantially parallel legs, each leg extending across a width of said upper surface of said upper panel rail;
   b) a first upright structure extending perpendicularly from said base structure and having a distal end;
   c) a first perpendicular holding structure extending from said distal end of said upright structure holding the at least one panel;
   d) a spring structure comprising at least a resilient bushing, the spring structure being positioned on and above said base structure to exert a force on the at least one panel when held by said panel clip; and, wherein
   e) said horizontal support that extends along the upper surface of said upper panel rail contains a first single discrete aperture, and said resilient bushing comprising a second single discrete aperture arranged to complement said first single discrete aperture in said horizontal support and configured so that a first through connector is positioned through both said first and second discrete apertures holding said panel clip to said upper surface of said upper panel rail through a third single discrete aperture in said upper panel rail.

2. The array of claim 1, wherein said at least one external panel is a solar panel.

3. The array of claim 2, wherein said at least one panel clip secures the solar panel so that at least two corners of said at least one external panel extend beyond adjacent upper panel rails.

4. A bi-directional panel support array including a plurality of separate, individually attachable panel clips holding at least one panel to a plurality of upper panel rails by using said plurality of separate, individually attachable panel clips spaced along a perimeter of said at least one panel, at least one said individually attachable panel clip comprising:
   a) a base structure having a horizontal support extending along a length of an upper surface of one of said upper panel rails, a pair of substantially parallel legs extending perpendicularly from said horizontal support and across a width of said upper surface of one of said upper panel rails;
   b) at least one upright structure extending perpendicular from said horizontal support, said upright structure having a distal end opposite said horizontal support;
   c) at least one perpendicular holding structure extending horizontally from said distal end of said upright structure applying a spring-generated pressure by a spring structure against said at least one panel when held by said at least one said individually attachable panel clip; and, wherein
   d) said spring structure comprises a resilient portion arranged beneath said base structure, said spring structure extending along the length of one of said upper panel rails, interfacing with said base structure when the at least one said individually attachable panel clip is connected to the upper surface of one of said upper panel rails, said spring structure further comprising a flexible ridge across a width of said resilient portion, said flexible ridge applying pressure against said at least one panel, and two legs with each leg extending on an opposite side of one of said upper panel rails.

5. The array of claim 4, further comprising a through connector with a spacer.

6. The array of claim 5, further comprising a split lock washer around said connector.

7. A bi-directional panel support array including a plurality of separate, individually attachable panel clips holding at least one solar panel to a plurality of upper panel rails by using said plurality of separate, individually attachable panel clips spaced along a perimeter of said at least one solar panel, each said panel clip comprising:
   a) a base structure having a horizontal support extending along an upper surface of one of said upper panel rails;
   b) at least one upright structure extending perpendicular from said horizontal support, said upright structure having a distal end opposite said horizontal support;
   c) at least one perpendicular holding structure extending from said distal end of said upright structure and applying a spring-generated pressure against said solar panel when held by said panel clip;
   d) a spring component arranged in contact with said base structure, said spring component having a resilient bushing with aperture; and, wherein,
   e) a pass-through connector includes a spacer extending through said aperture of the resilient bushing thereby holding the horizontal support and said spring component together when the panel clip is connected to said one of said upper panel rails via a single discrete aperture in said one of said upper panel rails.

8. The array of claim 7, wherein said resilient bushing comprises a split lock washer.

9. The array of claim 7, wherein said base structure further comprises two substantially parallel support legs extending perpendicular to said horizontal support and across a width of said upper surface of one of said upper panel rails.

\* \* \* \* \*